(12) United States Patent
Namura

(10) Patent No.: US 7,030,191 B2
(45) Date of Patent: Apr. 18, 2006

(54) MELT PROCESSIBLE COPOLYMER COMPOSITION

(75) Inventor: Shinichi Namura, Shizuoka (JP)

(73) Assignee: DuPont Mitsui Fluorochemicals Co., Ltd., Shizuoka (JP)

( * ) Notice: Subject to any disclaimer, the term of this patent is extended or adjusted under 35 U.S.C. 154(b) by 0 days.

(21) Appl. No.: 11/209,417

(22) Filed: Aug. 23, 2005

(65) Prior Publication Data

US 2006/0020085 A1 Jan. 26, 2006

Related U.S. Application Data

(63) Continuation of application No. 10/691,140, filed on Oct. 22, 2003, now abandoned.

(51) Int. Cl.
  *C08L 27/18* (2006.01)
(52) U.S. Cl. .................. 525/200; 525/199; 526/247
(58) Field of Classification Search ................ 525/199, 525/200; 526/247
  See application file for complete search history.

(56) References Cited

U.S. PATENT DOCUMENTS

| | | | |
|---|---|---|---|
| 4,029,868 A | 6/1977 | Carlson | |
| 5,461,129 A | 10/1995 | Kurihara et al. | |
| 5,463,006 A | 10/1995 | Abusleme et al. | |
| 5,603,999 A * | 2/1997 | Namura et al. | 428/36.92 |
| 5,708,044 A * | 1/1998 | Branca | 521/145 |
| 5,760,151 A | 6/1998 | Aten et al. | |
| 6,248,435 B1 * | 6/2001 | Leck | 428/323 |
| 6,649,699 B1 * | 11/2003 | Namura | 525/199 |
| 2002/0061398 A1 * | 5/2002 | Heffner et al. | 428/373 |
| 2002/0099143 A1 | 7/2002 | Namura | |

FOREIGN PATENT DOCUMENTS

| | | |
|---|---|---|
| EP | 1 028 139 A2 | 8/2000 |
| EP | 1 063 245 A1 | 12/2000 |
| WO | WO 01/60911 A1 | 8/2001 |
| WO | WO 02/10487 A2 | 2/2002 |

OTHER PUBLICATIONS

Encyclopedia of Polymer Science and Engineering, vol. 16, PP 597-598, John Wiley & Sons, New York, 1989.

* cited by examiner

*Primary Examiner*—David W. Wu
*Assistant Examiner*—Henry S. Hu

(57) ABSTRACT

A composition comprising tetrafluoroethylene/perfluoro (alkyl vinyl ether) copolymer and PTFE micropowder with flex life superior to compositions made exclusively of tetrafluoroethylene/perfluoro(alkyl vinyl ether) copolymer having equivalent perfluoro(alkyl vinyl ether) content and melt flow rate.

9 Claims, No Drawings

MELT PROCESSIBLE COPOLYMER COMPOSITION

This application Ser. No. 11/209,417 filed Aug. 23, 2005 is a CON of Ser. No. 10/691,140 filed on Oct. 22, 2003, now abandoned.

FIELD OF THE INVENTION

The present invention relates to highly mechanically durable melt processible tetrafluoroethylene/perfluoro(alkyl vinyl ether) copolymer compositions.

BACKGROUND OF THE INVENTION

Because of their excellent properties such as heat resistance (upper use temperature) and chemical resistance, tetrafluoroethylene/perfluoro(alkyl vinyl ether) copolymers are molded by such techniques as injection molding, blow molding, transfer molding, and melt compression molding, for use in pipes, joints, chemical storage vessels, in semiconductor manufacturing and at chemical plants, and used for lining pipes, tanks, and other containers.

The copolymer for such applications must be highly resistant to stress cracking. This type of mechanical durability can be improved by increasing in the perfluoro(alkyl vinyl ether) content of the copolymer, which however, results in reduced upper use temperature and increased manufacturing cost. Stress crack resistance can also be improved by increasing the copolymer molecular weight, but this results in reduced melt flow rate, which affects melt processibility adversely. It is an object of the invention to provide a copolymer composition which is excellent in mechanical durability and melt processibility utilizing only a small incorporated amount of a perfluoro(alkyl vinyl ether).

SUMMARY OF THE INVENTION

The invention is a composition comprising of about 70 to 45% by weight of a copolymer of about 95 to 90% by weight of tetrafluoroethylene and about 5 to 10% by weight of perfluoro(alkyl vinyl ether) and about 30 to 55% by weight of polytetrafluoroethylene, wherein said copolymer has a melt flow rate of about 0.1 to 1.7 g/10 min at 372±1° C. and said polytetrafluoroethylene has a melt flow rate of not less than about 1 g/10 min at 372±1° C.

DETAILED DESCRIPTION

Copolymers of this invention have repeat units derived from tetrafluoroethylene (TFE) and perfluoro(alkyl vinyl ethers) (PAVE). The PAVE is represented by Formula 1 or Formula 2.

Formula 1: $CF_2=CF(OCF_2CF(CF_3))_n-O-(CF_2)_mCF_2X$
where X=H or F, n in an integer from 0 to 5 and m in an integer from 0 to 7.

Formula 2: $CF_2=CF(OCF_2CF(CF_3))_q-O-CF_2CF(CF_3)_2$
where q is an integer from 0 to 3.

Preferred PAVEs are perfluoro(propyl vinyl ether) (PPVE) and perfluoro(ethyl vinyl ether) (PEVE). Copolymers with PEVE are more preferred because they exhibit excellent mechanical durability. Such copolymer may be manufactured by emulsion polymerization, suspension polymerization, solution polymerization, in aqueous solution, in nonaqueous solvent, or in mixed media, which are disclosed in U.S. Pat. No. 5,760,151, Unexamined Japanese Application Publication Kokai H7-126329 and the like.

PAVE content in copolymers of this invention is in the range of about 5 to 10% by weight, preferably about 6 to 10% by weight, and more preferably about 7 to 10% by weight. PAVE content of less than about 5% by weight is unsatisfactory in mechanical durability while a content of about 10% by weight or greater is disadvantageous with respect to heat resistance (upper use temperature) and manufacturing cost. The copolymer of this invention should have a melt flow rate (MFR) at 372±1° C. of about 0.1 to 1.7 g/10 min, preferably about 0.3 to 1.5 g/10 min, and more preferably about 0.3 to 1.3 g/10 min. An MFR exceeding about 1.7 g/10 min will give a composition with unsatisfactory mechanical durability. An MFR of less than about 0.1 g/10 min is not preferred because the resulting composition will be difficult to melt-process.

The present invention calls for blending the TFE/PAVE copolymer with polytetrafluoroethylene (PTFE). The PTFE to be compounded is a tetrafluoroethylene homopolymer or a modified PTFE containing a small amount, not more than about 1% by weight, of a comonomer such as hexafluoropropylene, PAVE, fluoroalkylethylene, or chlorotrifluoroethylene, and is melt-flowable. This type is known as "PTFE micro-powder" or "PTFE wax." Such PTFEs are described in "Encyclopedia of Polymer Science and Engineering," volume 16, pp. 597–598, John Wiley & Sons, 1989. They can be prepared by radiation or thermal degradation of non-melt flowable high molecular weight PTFEs, called "Molding powders" or "Fine powders", or directly by polymerization of tetrafluoroethylene in the presence of a chain transfer agent. For specific methods for manufacture, the following should be referred to: Japanese Patent Application Publications S47-19619, S52-38870, etc. for the radiation degradation processes; U.S. Pat. Nos. 3,067,262, 6,060,167, Japanese Patent Application Publication S57-22043, Unexamined Japanese Patent Application Publication Kokai H7-90024, etc. for direct polymerization processes. Conventionally available melt-flowable PTFEs have MFRs of 0.01 to 1000 g/10 min at 372±1° C., but for the purposes of the present invention the PTFE should have an MFR of at least about 1 g/10 min, preferably at least about 10 g/10 min. PTFE with an MFR less than about 1 g/10 min is not preferred because of the difficulty in melt processing the resulting composition. Use of PTFE having an MFR at least about 1 MFR unit (g/10 min) greater than that of the copolymer with which it is to be combined is preferred because it improves the melt processibility of the composition. More preferably the PTFE MFR is at least about 5 MFR units greater than that of the copolymer, and most preferably at least about 10 MFR units greater.

There are no particular limitations as to the physical form of the PTFE. Commercial PTFE micropowder is usually available at an average particle size of about 0.01 to 100 µm. For the ease of procuring a uniform composition, a powder with a particle size of about 0.05 to 50 µm is preferred, and more preferably about 0.05 to 25 µm.

The lower limit for the PTFE to be blended in the composition of this invention is about 30% by weight of the combined TFE/PAVE copolymer and PTFE, preferably about 35% by weight, while the upper limit is about 55% by weight, preferably about 50% by weight. The greater the amount of PTFE blended, the more advantageous in terms of cost due to the reduced amount of comonomer used in the composition, but a blended amount of about 55% by weight or greater is not preferred because it has a detrimental effect on mechanical durability.

In mixing the copolymer with PTFE in this invention, the presence of a locally high concentration of PTFE in the molded article can reduce durability. Therefore it is preferred to melt mix the TFE/PAVE and PTFE to produce a homogenous composition, for example by feeding the copolymer and the PTFE into a batch type or continuous type milling machine or a twin-screw extruder. Prior to melt mixing, the copolymer and PTFE powder may be premixed by a conventional method such as dry blending or wet blending. A blended powder of PTFE and copolymer can also be obtained by having PTFE or copolymer particles in the polymerization medium in a polymerization kettle, followed by initiating the polymerization for either the copolymer or PTFE. The present invention also allows for fluorination treatment of the copolymer and PTFE before or after melt mixing by the method described in U.S. Pat. No. 4,743,658, for the purpose of stabilizing polymer end groups.

The composition may be in the form of a melt processible composition, such as for extrusion or other molding operation, or in the form of the final molded article.

In the case of TFE/PAVE copolymer alone, a correlation has been observed between the flex life, which is an indication of mechanical durability such as stress crack resistance, the copolymer MFR, and the comonomer content. The equation is given in the Reference Example, below. The compositions of this invention exhibits a flex life far greater than that predicted from this equation. In other words, the composition of this invention shows mechanical durability, as reflected in flex life, superior to that of copolymers having equivalent MFR and equivalent comonomer content.

A advantage of the invention is that with one or two TFE/PAVE copolymer and PTFE of several melt flow rates, compositions can be mixed to achieve desired mechanical durability as measured by flex life. This ability to tailor the composition to the need without having to make a copolymer specifically for the purpose saves time and money. Furthermore, the price of PTFE is much less than that of TFE/PAVE copolymer so the compositions of this invention are significantly cheaper than the copolymer alone while having the same or better mechanical durability.

EXAMPLES

The present invention is specifically explained by Examples given below. Physical properties are measured according to the following methods:

Comonomer (PEVE) content: This is determined by measuring, in the infrared absorption spectrum (nitrogen atmosphere) an about 50 μm thick film, prepared by compressing the polymer at 350° C. and water-cooling the press, the ratio of the absorptivity at wavelength 9.17 μm to that at wavelength 4.25 μm, and calculating comonomer content according to the equation given below in accordance with the procedure described in U.S. Pat. No. 5,760,151. PEVE % by weight=0.75+1.28× (absorptivity at 9.17 μm/absorptivity at 4.25 μm).

Melt flow rate (MFR): This is measured according to ASTM D 1238-95 using a melt indexer (made by Toyo Seiki Company) equipped with a corrosion resistant cylinder, die, and piston, by filling a cylinder held at 372 ±1° C. with a 5 g sample, holding for 5 minutes, and extruding the sample under a 5 kg weight (piston+weight) through a die orifice; the extrusion rate (g/10 min) of the melt is the MFR.

Flex life: This is determined by cutting an about 110 mm long and 15 mm wide test strip from an about 0.3 mm thick film prepared by melt-compression molding at 350° C., mounting it on a folding endurance tester in accordance with ASTM D-2176 specification, folding at a speed of 175 cycles/min through an angle of 135° to the right and left under a 1 kg load, and recording the number of folding cycles until the test strip breaks. The average of the number of cycles to failure for three test strips is reported as the flex life.

Reference Examples

Flex life is measured for TFE/PEVE copolymer samples A to G listed in Table 1. The copolymers are prepared by polymerization according to the method described in U.S. Pat. No. 5,760,151. Analysis of the data shows the correlation between the flex life, MFR and comonomer content, which is represented by the Equation (1) below. The measured flex life and that calculated from the equation are summarized in Tables 1 and 2. Measured and calculated values are in good agreement, indicating that the flex life can be confidently predicted for a copolymer alone using Equation (1):

$$\ln(\text{flex life})=11.54-1.68\times\ln(MFR)+2.59\times \ln(PEVE \text{ \% by weight}). \quad (1)$$

Example 1

TFE/PAVE copolymer powder with PEVE content of 8.6% by weight and MFR=0.5 polymerized by the method described in U.S. Pat. No. 5,760,151 and PTFE powder (Zonyl® MP1600N, DuPont Company, Wilmington Del. USA) with an MFR 15.1, at weight ratio 60:40, are melt mixed using a Toyo Seiki Plastomill (RH60 model) at 360° C. and 30 rpm to give copolymer compositions. Table 3 summarizes the properties of the compositions. Measured flex life is superior to the flex life as calculated using Equation (1) based on the MFR and PEVE content of the TFE/PAVE+PTFE composition.

Comparative Example 1

A composition similar to that of Example 1 is prepared except that the weight ratio of the copolymer to PTFE is 40:60. Table 3 shows the properties of the compositions. Because of the excessive amount of PTFE in this composition, flex life is inferior to that expected from the composition MFR and PEVE content according to Equation (1).

Example 2

A composition is prepared in a manner similar to that of Example 1 except for using a TFE/PEVE copolymer powder having a PEVE content of 8.3% by weight and an MFR of 1.1. Table 3 summarizes the properties of the composition. Measured flex life is more than twice that expected given the MFR and PEVE content of the composition in view of Equation (1).

Comparative Example 2

A composition is prepared in a manner similar to that of Example 1 except for using a TFE/PEVE copolymer powder with PEVE content of 6.6% by weight and MFR of 1.9. Table 3 summarize the properties of the composition. Table 3 indicates that on the one hand, the compositions of these Examples of the invention show measured flex life values far exceeding those calculated from the above relationship between the MFR and comonomer content of the composition; on the other hand, comparative example compositions give measured values equal or inferior to the calculated values. These results show that the composition of this invention exhibits superior mechanical durability over these copolymers alone at equivalent MFR and comonomer content.

Table 1

TABLE 1

|  | Reference Examples | | | |
|---|---|---|---|---|
| Copolymer | A | B | C | D |
| Comonomer content (% by weight) | 4.2 | 4.5 | 4.5 | 5.0 |
| MFR (g/10 mm) | 1.6 | 3.3 | 5.3 | 11.9 |
| Flex life (cycles) Measured | 1.90 million | 0.65 million | 0.33 million | 0.1 million |
| Calculated | 1.90 million | 0.68 million | 0.31 million | 0.1 million |

Table 2

TABLE 2

|  | Reference Examples | | |
|---|---|---|---|
| Copolymer | E | F | G |
| Comonomer content (wt %) | 5.1 | 5.2 | 6.1 |
| MFR (g/10 min.) | 1.8 | 9.2 | 9.6 |
| Flex life (cycles) Measured | 2.50 million | 0.18 million | 0.26 million |
| Calculated | 2.60 million | 0.18 million | 0.26 million |

Table 3

TABLE 3

|  | Example 1 | Comp. Ex. 1 | Example 2 | Comp. Ex. 2 |
|---|---|---|---|---|
| Copolymer Comonomer Content (wt %) A | 8.6 | 8.6 | 8.3 | 6.6 |
| MFR (g/10 mm.) | 0.5 | 0.5 | 1.1 | 1.9 |
| PTFE MER 15.1 g/10 min (wt %) B | 40 | 60 | 40 | 40 |
| Composition Comonomer Content (wt %) C | 5.2 | 3.4 | 5.0 | 4.0 |
| MFR (g/10 mm.) | 1.3 | 2.6 | 2.6 | 4.4 |
| Flex life (cycles) Measured | >5.3 million | 0.12 million | 2.7 million | 0.35 million |
| Calculated | 4.7 million | 0.49 million | 1.3 million | .31 million |

TABLE 3-continued

|  | Example 1 | Comp. Ex. 1 | Example 2 | Comp. Ex. 2 |
|---|---|---|---|---|

Comonomer content C in the composition was calculated from the following equation as a weight % of comonomer with respect to the sum of the copolymer and PTFE:
$C = A \times (1 - (B/100))$ The present invention improves durability using a small amount of perfluoro(alkyl vinyl ether), which is advantageous in terms of heat resistance and manufacturing cost compared to cases where durability is to be improved by increasing the amount of comonomer. The composition of Example 2 is advantageous over the copolymer of Reference Example E by exhibiting both higher MFR and higher flex life. Since the composition of this invention contains a large proportion of highly crystalline PTFE, it also shows excellent resistance to permeation. Hence, the composition of this invention is useful as a molding material for transfer equipment such as pipes, pumps, and other containers, which are used in semiconductor manufacturing steps and chemical processes and the like, or else as a lining material for pipes, tanks, and other containers.

What is claimed is:

1. A melt processable composition comprising about 65 to 45% by weight of a copolymer of about 95 to 90% by weight of tetrafluoroethylene and about 5 to 10% by weight of perfluoro(alkyl vinyl ether) and about 35 to 55% by weight of polytetrafluoroethylene, wherein said copolymer has a melt flow rate of about 0.1 to 1.7 g/10 min at 372±1° C. and said polytetrafluoroethylene has a melt flow rate of not less than about 1 g/10 min at 372±1° C.

2. The composition of claim 1, wherein said perfluoro (alkyl vinyl ether) is perfluoro(ethyl vinyl ether).

3. The composition of claim 1, wherein said polytetrafluoroethylene has a melt flow rate at least about 10 units greater than the melt flow rate of the copolymer.

4. The composition of claim 1, wherein said copolymer and polytetrafluoroethylene are melt mixed.

5. The composition of claim 1, wherein the composition has a measured Flex Life of greater than 2.7 million cycles.

6. The composition of claim 1, wherein the composition has a calculated Flex Life of greater than 1.3 million cycles.

7. A container comprising a composition including about 70 to 45% by weight of a copolymer of about 95 to 90% by weight of tetrafluoroethylene and about 5 to 10% by weight of perfluoro(alkyl vinyl ether) and about 30 to 55% by weight of polytetrafluoroethylene, wherein said copolymer has a melt flow rate of about 0.1 to 1.7 g/10 min at 372±1° C. and said polytetrafluoroethylene has a melt flow rate of not less than about 1 g/10 min at 372±1° C.

8. The composition of claim 7, wherein the composition has a measured Flex Life of greater than 2.7 million cycles.

9. The composition of claim 7, wherein the composition has a calculated Flex Life of greater than 1.3 million cycles.

\* \* \* \* \*